US012249203B2

(12) United States Patent
Ahn et al.

(10) Patent No.: US 12,249,203 B2
(45) Date of Patent: Mar. 11, 2025

(54) CASH DISPENSER UNIT AND AUTOMATIC RECOVERY METHOD OF THE SAME

(71) Applicant: HYOSUNG TNS INC., Seoul (KR)

(72) Inventors: Byung Man Ahn, Gyeonggi-do (KR); Ji Youn Cho, Seoul (KR); Seung Jin Jung, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 222 days.

(21) Appl. No.: 18/120,052

(22) Filed: Mar. 10, 2023

(65) Prior Publication Data

US 2023/0290211 A1 Sep. 14, 2023

(30) Foreign Application Priority Data

Mar. 14, 2022 (KR) ........................ 10-2022-0031318
Mar. 18, 2022 (KR) ........................ 10-2022-0034036

(51) Int. Cl.
*G07D 11/00* (2019.01)
*G07D 11/14* (2019.01)
(Continued)

(52) U.S. Cl.
CPC ............. *G07D 11/18* (2019.01); *G07D 11/14* (2019.01); *G07D 11/237* (2019.01); *G07D 11/26* (2019.01);
(Continued)

(58) Field of Classification Search
CPC ...... G07D 11/18; G07D 11/14; G07D 11/237; G07D 11/26; G07D 11/40; G07D 11/16;
(Continued)

(56) References Cited

U.S. PATENT DOCUMENTS 5,597,996 A * 1/1997 Flood ..................... G07D 11/40
235/379
6,014,594 A * 1/2000 Heidel ................... G07D 11/12
194/207
(Continued)

*Primary Examiner* — Luis A Gonzalez
(74) *Attorney, Agent, or Firm* — BACON & THOMAS, PLLC

(57) ABSTRACT

Provided are a cash dispenser unit (CDU) and an automatic recovery method of the same. The CDU includes a storage for storing bills, a withdrawal part for externally discharging bills withdrawn from the storage, a retrieval part for retrieving bills remaining on a bill conveyance path between the storage and the withdrawal part, a conveyance part for providing the bill conveyance path between the storage and the retrieval part and the bill conveyance path between the storage and the withdrawal part and including a first conveyance part connecting an outlet of the storage and a conveyance path connector, a second conveyance part connecting the conveyance path connector and an entry of the retrieval part, and a third conveyance part connecting the entry of the retrieval part and the withdrawal part, wherein the first conveyance part, the second conveyance part, and the third conveyance part are driven by one motor, a gate provided at the entry of the retrieval part to switch a travel direction of bills passing through the conveyance path toward the retrieval part, and a controller for controlling an operation of withdrawing or retrieving the bills and restoring the CDU to a normal operation state in a case of initialization or recovery from a power failure by retrieving bills remaining on the bill conveyance path of the conveyance part to the retrieval part.

16 Claims, 7 Drawing Sheets

(51) Int. Cl.

| | |
|---|---|
| ***G07D 11/18*** | (2019.01) |
| ***G07D 11/237*** | (2019.01) |
| ***G07D 11/26*** | (2019.01) |
| ***G07F 19/00*** | (2006.01) |

(52) U.S. Cl.
CPC ...... *G07F 19/203* (2013.01); *B65H 2403/942* (2013.01); *B65H 2513/412* (2013.01); *B65H 2701/1912* (2013.01); *G07D 2211/00* (2013.01)

(58) Field of Classification Search
CPC ........ G07D 2211/00; B65H 2701/1912; B65H 2403/942; B65H 29/60; G07F 19/203
See application file for complete search history.

(56) References Cited

U.S. PATENT DOCUMENTS

| | | | | |
|---|---|---|---|---|
| 6,427,998 | B1 * | 8/2002 | Norrie .................. | G07D 11/245 271/145 |
| 7,225,343 | B1 * | 5/2007 | Honig ..................... | G06F 16/13 713/193 |

* cited by examiner

CASH DISPENSER UNIT AND AUTOMATIC RECOVERY METHOD OF THE SAME

BACKGROUND

1. Field of the Invention

The present invention relates to a cash dispenser unit (CDU) and an automatic recovery method of the same, and more specifically, to a CDU in which a bill conveyance structure is simplified by driving a plurality of separated conveyance parts using one motor and bills remaining on the conveyance parts may be stably retrieved using three conveyance parts, and an automatic recovery method of the same.

2. Discussion of Related Art

An automated teller machine (ATM) is an apparatus developed to rapidly and conveniently provide most financial services other than counseling at any time without manpower, and uses a cash deposit unit, a cash deposit/dispenser unit, a cash dispenser unit (CDU), etc.

The CDU separates bills contained in a storage, transfers the bills through a conveyance part, and then enables the bills to be withdrawn by a customer.

The CDU examines whether the bills are separated from each other, whether the bills are damaged, whether the bills are forged, etc. When it is determined that a normal transaction is not possible, the CDU may switch a bill conveyance path to retrieve bills through a retrieval part.

Existing CDUs include a plurality of conveyance parts as means for conveying bills between a storage and a retrieval part and between the storage and a withdrawal part. Many parts, such as a motor as a driving means and gears, pulleys, and belts as power transmission means, are used in each of the plurality of conveyance parts.

However, when motors are separately used for driving the plurality of conveyance parts, the CDU has a complicated structure and a large size, and thus the manufacturing cost increases.

Meanwhile, while bills are conveyed along a conveyance path, power supply may be cut off due to a power failure or the like, or a power switch may be turned off to initialize the CDU. In this case, the bills remain on the conveyance path. Here, even when the power is supplied again, the CDU cannot be used until a manager manually retrieves the bills on the conveyance path.

Therefore, a CDU and an automatic recovery method of the CDU are required for stably retrieving bills which remain on a conveyance path due to a power failure or the like, without causing a jam.

The related art of a CDU is disclosed in Korean Patent No. 10-0512993 and Korean Utility Model No. 20-0379150.

SUMMARY OF THE INVENTION

The present invention is directed to providing a cash dispenser unit (CDU) that has a simplified bill conveyance structure and allows smooth retrieval of bills remaining on a bill conveyance path.

The present invention is also directed to providing an automatic recovery method of a CDU for stably retrieving bills which remain on a conveyance part when the CDU recovers from a power failure or is initialized.

According to an aspect of the present invention, there is provided a cash dispenser unit (CDU) comprising: a storage configured to store bills; a withdrawal part configured to externally discharge bills withdrawn from the storage; a retrieval part configured to retrieve bills remaining on a bill conveyance path between the storage and the withdrawal part; a conveyance part configured to provide the bill conveyance path between the storage and the retrieval part and the bill conveyance path between the storage and the withdrawal part and including a first conveyance part connecting an outlet of the storage and a conveyance path connector, a second conveyance part connecting the conveyance path connector and an entry of the retrieval part, and a third conveyance part connecting the entry of the retrieval part and the withdrawal part, wherein the first conveyance part, the second conveyance part, and the third conveyance part are driven by one motor; a gate provided at the entry of the retrieval part and configured to switch a travel direction of bills passing through the conveyance path toward the retrieval part; and a controller configured to control an operation of withdrawing or retrieving the bills and restore the CDU to a normal operation state in a case of initialization or recovery from a power failure by retrieving bills remaining on the bill conveyance path of the conveyance part to the retrieval part.

The CDU, wherein the first conveyance part includes a one-way bearing that is driven only in a forward direction corresponding to a bill withdrawal direction by receiving driving power of the motor and cuts off transmission of the driving power of the motor in a reverse direction of the forward direction, and the second conveyance part is driven in the forward direction or the reverse direction by receiving the driving power of the motor, the CDU further comprising a clutch configured to control transmission of the driving power of the motor transmitted by the second conveyance part to the third conveyance part.

The CDU, wherein, when the motor is driven in the forward direction, the first conveyance part and the second conveyance part are driven together in the forward direction, when the motor is driven in the reverse direction, the first conveyance part is stopped, and the second conveyance part is driven in the reverse direction, when the clutch enters an on state, the third conveyance part is driven in conjunction with the second conveyance part, and when the clutch enters an off state, the third conveyance part is stopped, and the second conveyance part is driven according to a driving direction of the motor.

The CDU, wherein a plurality of sensors are provided on the bill conveyance path to detect whether bills pass through the plurality of sensors, the gate is rotatable in both directions between an open position in which the travel direction of the bills passing through the bill conveyance path is set toward the retrieval part, and a closed position in which the bills pass along the bill conveyance path between the second conveyance part and the third conveyance part, and the gate includes a gate sensor configured to detect whether the gate is in the open position or the closed position.

The CDU, wherein, when the plurality of sensors detect that a bill remains on the bill conveyance path of at least one of the first conveyance part and the second conveyance part, the controller retrieves the bill remaining on the bill conveyance path to the retrieval part by performing control so that the gate enters the open position, the motor is driven in the forward direction, and the clutch enters the off state.

The CDU, wherein, when the gate sensor does not detect the open position or the closed position, the controller determines that the gate is in an unopenable state, drives the motor in the reverse direction and puts the clutch in the on state so that the second conveyance part and the third conveyance part are driven in the reverse direction and the bill remaining on the bill conveyance path is conveyed to the second conveyance part, and when a sensor for a recovery operation provided apart from the entry of the retrieval part on the second conveyance part detects that the bill is conveyed back to the second conveyance part, drives the second conveyance part in the forward direction by putting the gate in the open position, driving the motor in the forward direction, and putting the clutch in the off state so that the bill is conveyed from the second conveyance part to the retrieval part and retrieved.

The CDU, wherein, in a case of retrieving a bill remaining on the third conveyance part, the controller drives the second conveyance part and the third conveyance part in the reverse direction by putting the gate in the closed position, driving the motor in the reverse direction, and putting the clutch in the on state so that the bill remaining on the third conveyance part is conveyed back to the second conveyance part, and when a sensor for a recovery operation provided apart from the entry of the retrieval part on the second conveyance part detects that the bill is conveyed back to the second conveyance part, drives the second conveyance part in the forward direction by putting the gate in the open position, driving the motor in the forward direction, and putting the clutch in the off state so that the bill is conveyed from the second conveyance part to the retrieval part and retrieved.

The CDU, wherein, in the case of retrieving the bill remaining on the third conveyance part, even when a bill remains on the first conveyance part and the motor is driven in the reverse direction, the first conveyance part is stopped by the one-way bearing so that the bill remaining on the first conveyance part remains stationary without being conveyed back toward the storage.

According to an aspect of the present invention, there is provided an automatic recovery method of a cash dispenser unit (CDU), which includes a storage for storing bills, a withdrawal part for externally discharging bills withdrawn from the storage, a retrieval part for retrieving bills remaining on a bill conveyance path between the storage and the withdrawal part, a conveyance part for providing the bill conveyance path between the storage and the retrieval part and between the storage and the withdrawal part, and a gate provided at an entry of the retrieval part to switch a travel direction of bills passing through the bill conveyance path toward the retrieval part, for retrieving a bill remaining on the bill conveyance path in the CDU to the retrieval part, wherein the conveyance part includes a first conveyance part connecting an outlet of the storage and a conveyance path connector, a second conveyance part connecting the conveyance path connector and an entry of the retrieval part, and a third conveyance part connecting the entry of the retrieval part and the withdrawal part, the automatic recovery method comprising retrieving bills remaining on the first conveyance part and the second conveyance part to the retrieval part and then retrieving bills remaining on the third conveyance part to the retrieval part.

The automatic recovery method, wherein the gate is rotatable in both directions between an open position in which the travel direction of the bills passing through the bill conveyance path is set toward the retrieval part, and a closed position in which the bills are passed along the bill conveyance path between the second conveyance part and the third conveyance part, and the conveyance part is driven by one motor and includes a clutch configured to control transmission of driving power of the motor transmitted by the second conveyance part to the third conveyance part, the automatic recovery method further comprising: determining whether the gate is in an openable state; when the gate is in the openable state, determining whether there is a remaining bill on the basis of a signal detected by a sensor for a recovery operation provided apart from the entry of the retrieval part on the second conveyance part; when no bill is detected by the sensor for a recovery operation, driving the motor in a forward direction corresponding to a bill withdrawal direction with the gate in the open position to retrieve bills remaining on the first conveyance part and the second conveyance part to the retrieval part; putting the gate in the closed position, putting the clutch in an on state, and driving the motor in a reverse direction; and when the sensor for a recovery operation detects bills which are conveyed back from the third conveyance part passing therethrough, putting the gate in the open position and driving the motoring in the forward direction to retrieve the bills to the retrieval part.

The automatic recovery method, further comprising: when the sensor for a recovery operation detects a bill with the gate in the openable state, driving the motor in the reverse direction; and when the sensor for a recovery operation detects the bill passing therethrough due to reverse driving of the motor, stopping the motor and then driving the motor in the forward direction to retrieve the bill to the retrieval part.

The automatic recovery method, wherein, when the sensor for a recovery operation detects no bill passing therethrough after the driving of the motor in the reverse direction, it is determined that there is a failure.

The automatic recovery method, further comprising: when the gate is in an unopenable state, putting the clutch in the on state and driving the motor in the reverse direction; when the sensor for a recovery operation detects a bill passing therethrough due to reverse driving of the motor, stopping the motor; determining again whether the gate is in the openable state; and when the gate is in the openable state, putting the gate in the open position and driving the motor in the forward direction to retrieve the bill to the retrieval part.

The automatic recovery method, wherein, when the sensor for a recovery operation detects no bill passing therethrough after the driving of the motor in the reverse direction, it is determined that there is a failure.

The automatic recovery method, further comprising: when it is determined that the gate is not in the openable state in the determining again of whether the gate is in the openable state, putting the clutch in the on state and driving the motor in the reverse direction; and when the sensor for a recovery operation detects a bill passing therethrough due to reverse driving of the motor, stopping the motor and driving the motor in the forward direction to retrieve the bill to the retrieval part.

The automatic recovery method, wherein, when the sensor for a recovery operation detects no bill passing therethrough, it is determined that there is a failure.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
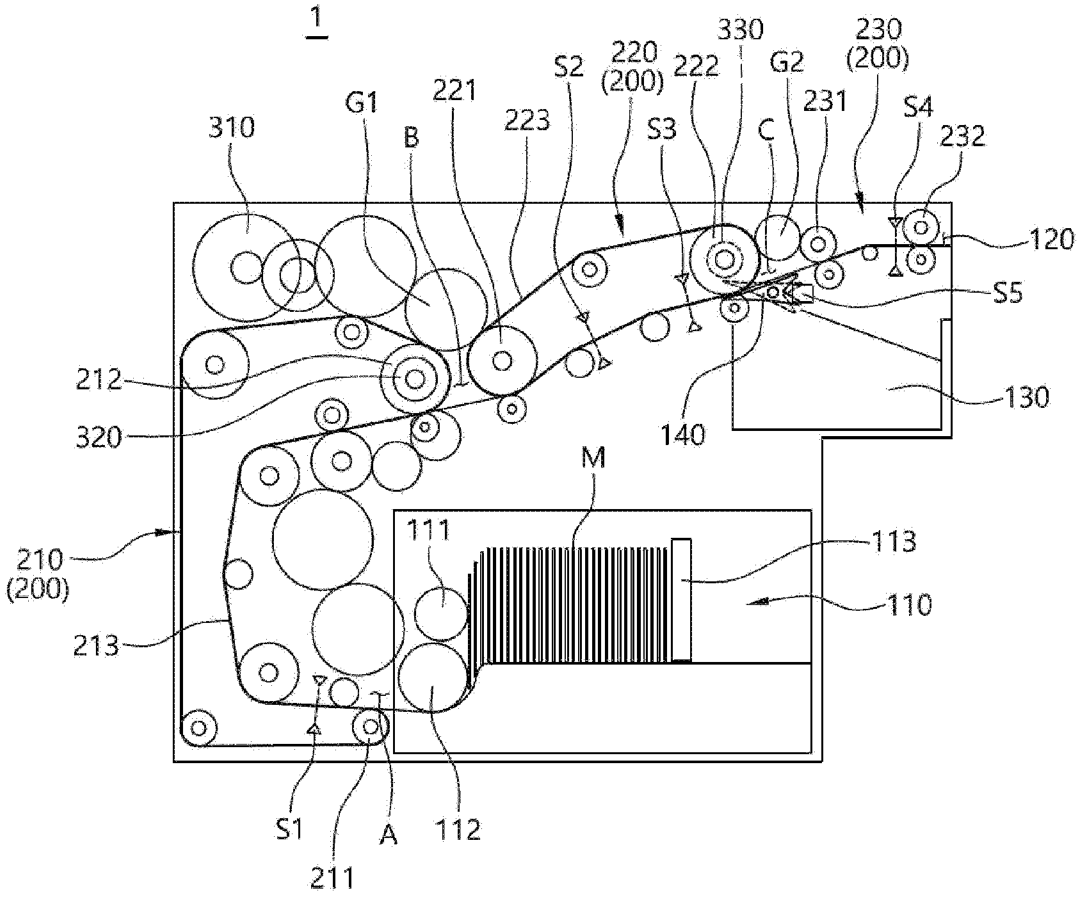
FIG. 1 is a diagram showing a configuration of a cash dispenser unit (CDU) according to the present invention.

Hereinafter, configurations and operations of exemplary embodiments of the present invention will be described in detail with reference to the accompanying drawings.

First, a configuration of a cash dispenser unit (CDU) 1 according to the present invention will be described with reference to FIGS. 1 and 2. The CDU 1 of the present invention includes a storage 110 for storing bills, a withdrawal part 120 for externally discharging bills withdrawn from the storage 110, a retrieval part 130 for retrieving bills remaining on a bill conveyance path between the storage 110 and the withdrawal part 120, a gate 140 provided at an entry of the retrieval part 130 to switch a travel direction of bills passing through the bill conveyance path to the retrieval part 130, a conveyance part 200 for providing the bill conveyance path between the storage 110 and the retrieval part 130 and between the storage 110 and the withdrawal part 120, a motor 310 for driving the conveyance part 200, and a controller 400 for controlling an operation of withdrawing and retrieving the bills and also retrieving bills remaining on the bill conveyance path in the case of initialization or recovery from a power failure so that the CDU 1 recovers to a normal operation state.

In the storage 110, bills M are stored. On an outlet side, a pickup roller 111 and a feed roller 112 for separating the bills M are provided, and a push plate 113 which supports the stored bills M and may reciprocate is included in the storage 110.

The withdrawal part 120 is an element provided on the front side of the CDU 1 so that a customer may acquire withdrawn bills that he or she requests.

The retrieval part 130 is an element for retrieving bills remaining on the bill conveyance path of the conveyance part 200 in the case of initialization or recovery from a power failure.

The gate 140 is provided on the entry side of the retrieval part 130 and configured to rotate in both directions between an open position and a closed position.

Referring to FIG. 1, the open position corresponds to a positional state in which the gate 140 has rotated clockwise so that the tip of the gate 140 protrudes to the bill conveyance path to guide bills conveyed along the conveyance part 200 toward the retrieval part 130. The closed position corresponds to a positional state in which the gate 140 has rotated counterclockwise so that the tip of the gate 140 deviates down from the bill conveyance path to allow bills to pass along the bill conveyance path between a second conveyance part 220 and a third conveyance part 230.

The conveyance part 200 includes a first conveyance part 210 connecting an outlet A of the storage 110 and a conveyance path connector B, the second conveyance part 220 connecting the conveyance path connector B and an entry C of the retrieval part 130, and the third conveyance part 230 connecting the entry C of the retrieval part 130 and the withdrawal part 120.

At both ends of the first conveyance part 210, a first pulley 211 and a second pulley 212 are provided. A plurality of rollers for forming a bill conveyance path of the first conveyance part 210 are provided between the first pulley 211 and the second pulley 212. A first belt 213 is connected to the first pulley 211, the second pulley 212, and the plurality of rollers.

At both ends of the second conveyance part 220, a third pulley 221 and a fourth pulley 222 are provided. A plurality of rollers for forming a bill conveyance path of the second conveyance part 220 are provided between the third pulley 221 and the fourth pulley 222. A second belt 223 is connected to the third pulley 221, the fourth pulley 222, and the plurality of rollers.

The third conveyance part 230 is provided adjacent to the withdrawal part 120, and first rollers 231 and second rollers 232 that border each other vertically to form a bill conveyance path of the third conveyance part 230 are provided at both ends of the third conveyance part 230.

A guide (not shown) for forming a bill conveyance path may be provided on surfaces each facing the first belt 213 and the second belt 223, between the first rollers 231, and between the second rollers 232.

The first conveyance part 210, the second conveyance part 220, and the third conveyance part 230 included in the conveyance part 200 are driven by the single motor 310. In the following description, a forward direction among driving directions of the conveyance part 200 and the motor 310 is a direction in which bills are withdrawn, and a reverse direction is a direction opposite to the forward direction.

The driving power of the motor 310 is transmitted to each of the second pulley 212 of the first conveyance part 210 and the third pulley 221 of the second conveyance part 220 through a plurality of connecting gears.

A one-way bearing 320 connected to a first connecting gear G1 is provided to the second pulley 212. The one-way bearing 320 functions to transmit power to the second pulley 212 when the motor 310 rotates in the forward direction and cut off power transmission when the motor 310 rotates in the reverse direction.

Therefore, when the motor 310 rotates in the forward direction, the first conveyance part 210 and the second conveyance part 220 are driven together in the forward direction, and when the motor 310 rotates in the reverse direction, the first conveyance part 210 is stopped, and only the second conveyance part 220 is driven in the reverse direction.

According to this configuration, when the second conveyance part 220 and the third conveyance part 230 are driven in the reverse direction to retrieve bills remaining on the third conveyance part 230 as will be described below, the first conveyance part 210 is stopped, and thus it is possible to prevent a jam which may be caused when bills remaining on the first conveyance part 210 are conveyed back toward the outlet A of the storage 110.

When the motor 310 is driven, the second conveyance part 220 is driven in the forward direction or the reverse direction according to the driving direction of the motor 310.

A clutch 330 is provided between the second conveyance part 220 and the third conveyance part 230 to control transmission of the driving power of the motor 310 transmitted by the second conveyance part 220, to the third conveyance part 230. The clutch 330 operates to be connected to or separated from the fourth pulley 222 of the second conveyance part 220. One side of the clutch 330 is connected to a second connecting gear G2, and the second connecting gear G2 is connected to the first rollers 231 of the third conveyance part 230 so that power may be transmitted. Accordingly, when the clutch 330 enters an on state, that is, connected to the fourth pulley 222, the driving power of the motor 310 is transmitted to the second conveyance part 220 and the third conveyance part 230 together so that the second conveyance part 220 and the third conveyance part 230 are driven according to the driving direction of the motor 310.

On the other hand, when the clutch 330 enters an off state, that is, separated from the fourth pulley 222, the driving power of the motor 310 is transmitted to the second conveyance part 220 only and not to the third conveyance part 230 so that only the second conveyance part 220 is driven according to the driving direction of the motor 310 and the third conveyance part 230 is stopped.

Meanwhile, a plurality of sensors S1, S2, S3, and S4 are provided on the bill conveyance path of the conveyance part 200 to detect whether bills pass.

The plurality of sensors S1, S2, S3, and S4 include the first sensor S1 which is provided on the first conveyance part 210 adjacent to the outlet A of the storage 110 to detect the lengths of bills passing through the outlet A of the storage 110 and whether the bills are skewed, the second sensor S2 which is provided in the middle of the second conveyance part 220 to detect whether bills pass and provide a synchronization signal for putting the gate 140 in the open position or the closed position in the case of retrieving remaining bills, the third sensor S3 which is provided at a position on the second conveyance part 220 spaced apart from the entry C of the retrieval part 130 to function as a sensor for a recovery operation for detecting whether bills pass in the case of retrieving bills, and the fourth sensor S4 which is provided on the third conveyance part 230 adjacent to the withdrawal part 120 to count the number of bills which are withdrawn.

Also, a gate sensor S5 is provided on one side of the gate 140 to detect whether the gate 140 is in the open position or the closed position.

Figure 2:
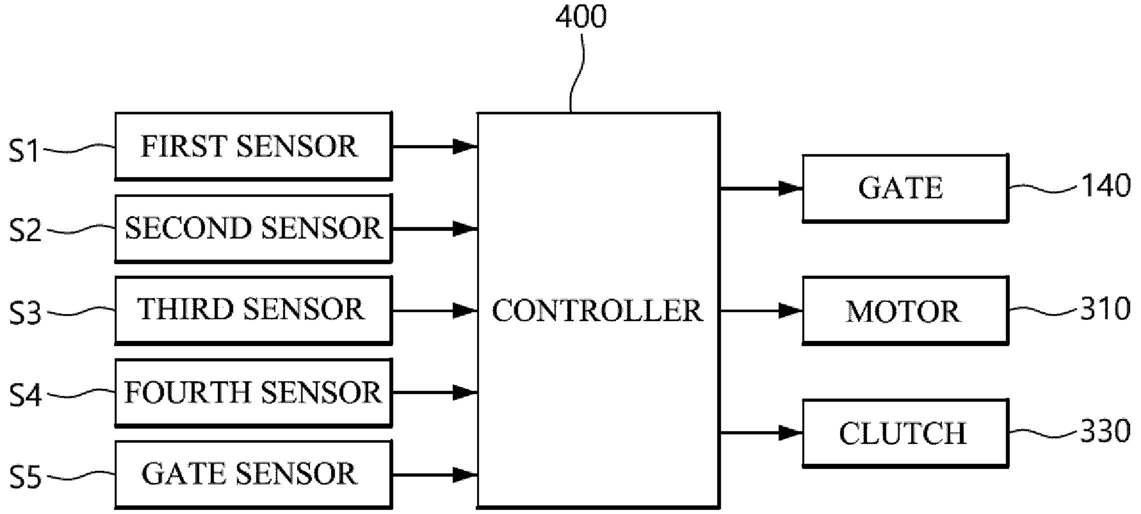
FIG. 2 is a control block diagram of the CDU according to the present invention.

Referring to FIG. 2, signals detected by the first to fourth sensors S1, S2, S3, and S4 and the gate sensor S5 are transmitted to the controller 400, and the controller 400 controls operations of the gate 140, the motor 310, and the clutch 330 on the basis of the signals for the purpose of withdrawal or retrieval of bills.

Operations of the CDU 1 of the present invention will be described below with reference to FIGS. 3 to 6.

Figure 3:
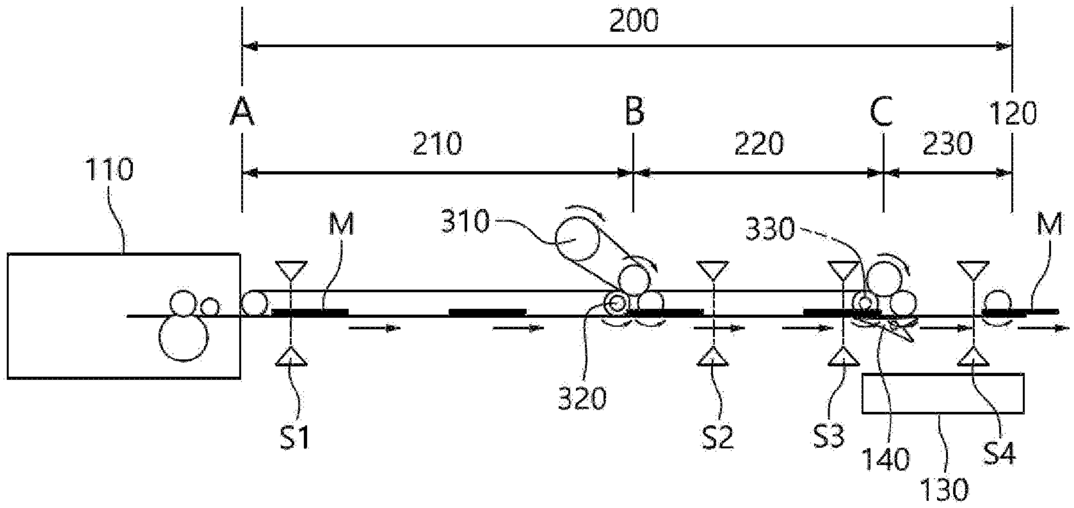
FIG. 3 is a diagram showing a normal bill withdrawal operation of the CDU according to the present invention.

Referring to FIG. 3, in a normal bill withdrawal operation of the CDU 1, the controller 400 performs control so that the gate 140 enters the closed position, the motor 310 is driven in the forward direction, and the clutch 330 enters the on state. Then, the bills M withdrawn from the storage 110 sequentially pass through the first conveyance part 210, the second conveyance part 220, and the third conveyance part 230 and are discharged normally through the withdrawal part 120.

Figure 4:
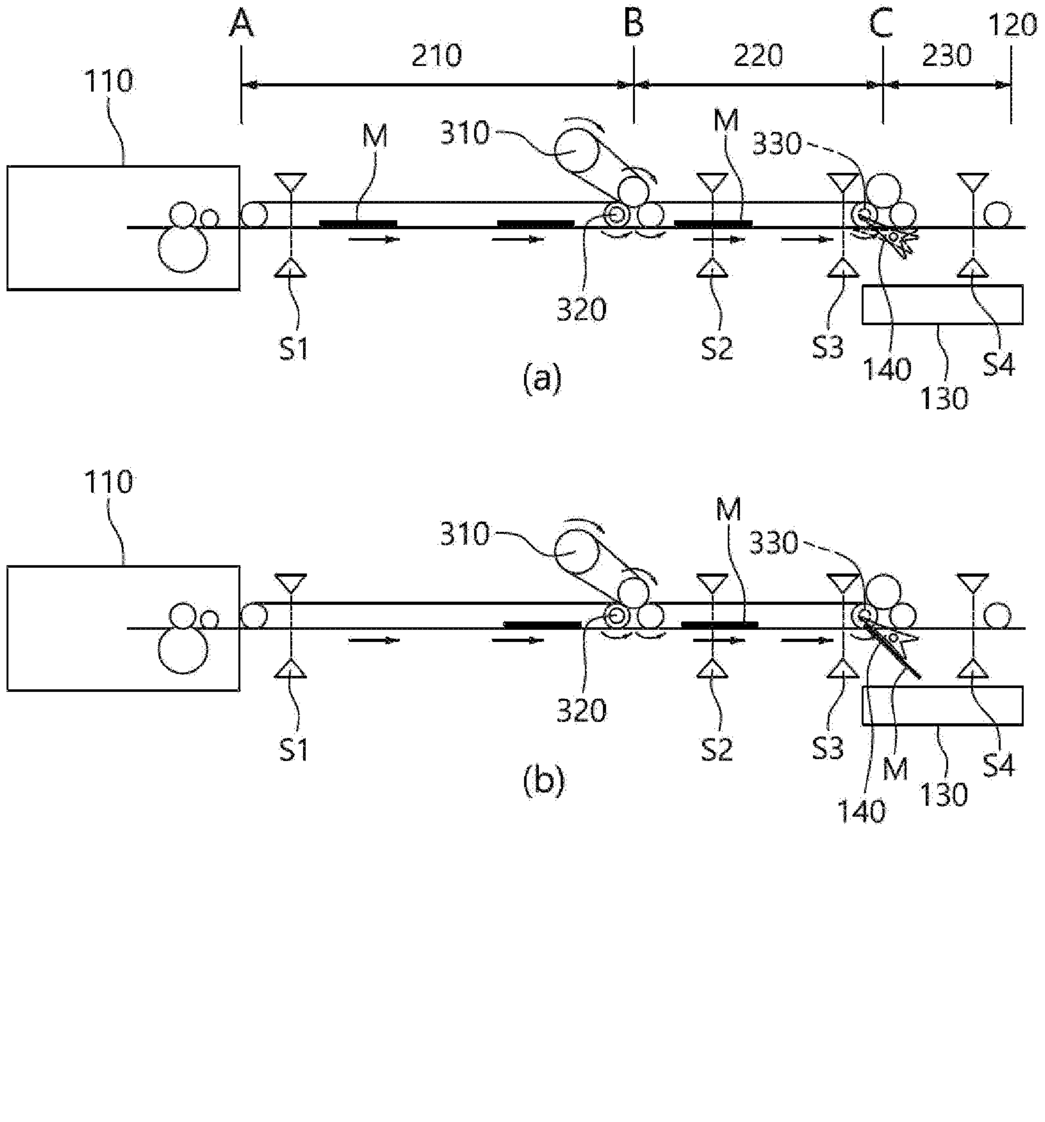
FIG. 4 is a set of diagrams showing an operation of retrieving bills remaining on a first conveyance part or a second conveyance part in the CDU according to the present invention.

Referring to FIG. 4, in an operation of retrieving bills remaining on a bill conveyance path of at least one of the first conveyance part 210 and the second conveyance part 220 in the CDU 1, the controller 400 performs control so that the gate 140 enters the open position, the motor 310 is driven in the forward direction, and the clutch 330 enters the off state. Then, bills remaining on the bill conveyance path are retrieved by the retrieval part 130.

Figure 5:
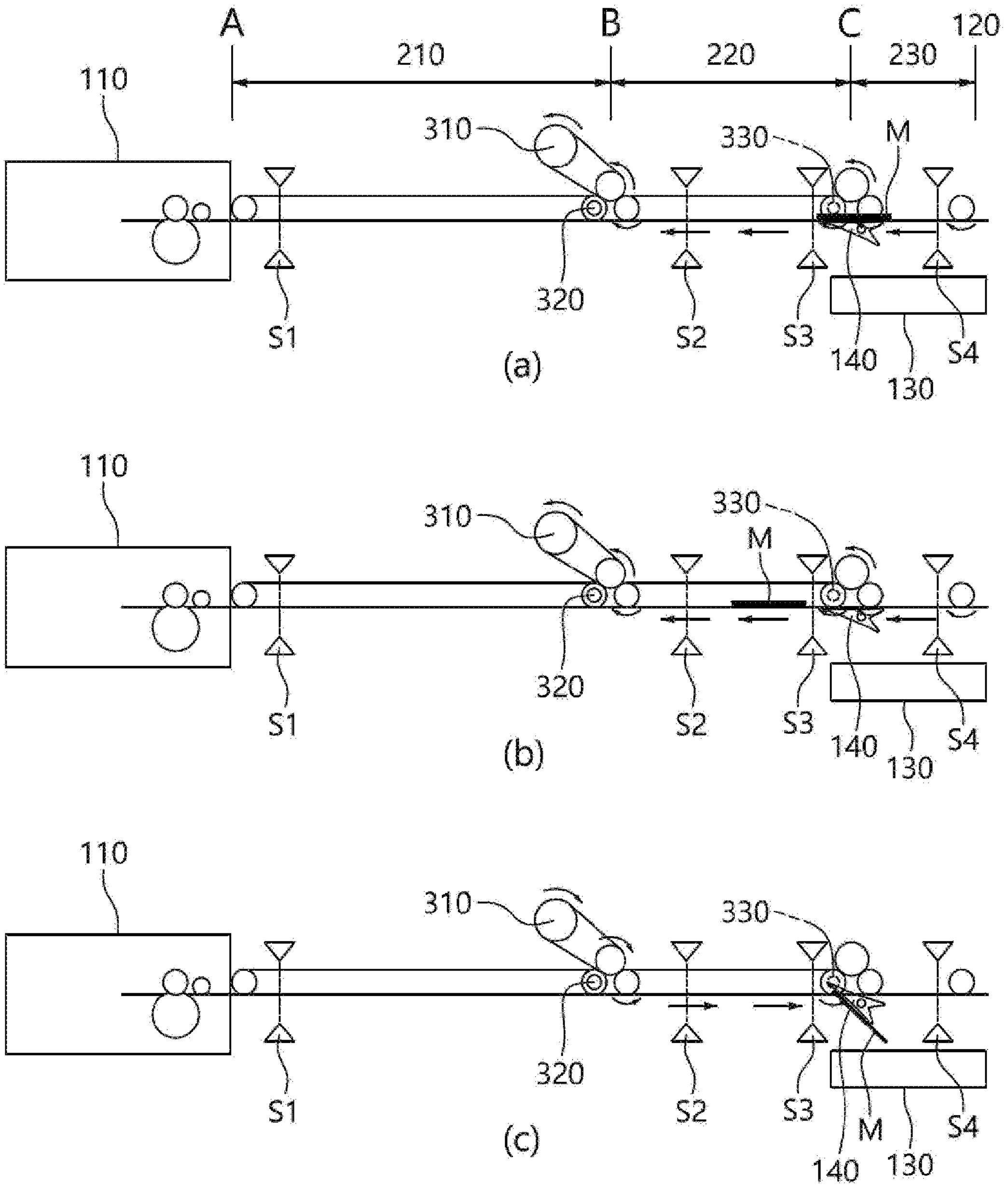
FIG. 5 is a set of diagrams showing an operation of retrieving bills when a gate is unopenable in the CDU according to the present invention.

Referring to FIG. 5, when the gate sensor S5 does not detect the open position or the closed position, the controller 400 determines that the gate 140 is in an unopenable state, and performs control so that the motor 310 is driven in the reverse direction and the clutch 330 enters the on state. Then, the second conveyance part 220 and the third conveyance part 230 are driven in the reverse direction, and bills remaining on the bill conveyance path are conveyed back to the second conveyance part 220 (see FIG. 5A).

When the sensor for a recovery operation (third sensor) S3 detects that the bills are conveyed to the second conveyance part 220 (see FIG. 5B), the controller 400 performs control so that the gate 140 enters the open position, the motor 310 is driven in the forward direction, and the clutch 330 enters the off state. Then, the second conveyance part 220 is driven in the forward direction, and the bills are conveyed from the second conveyance part 220 to the retrieval part 130 and retrieved (see FIG. 5C).

Figure 6:
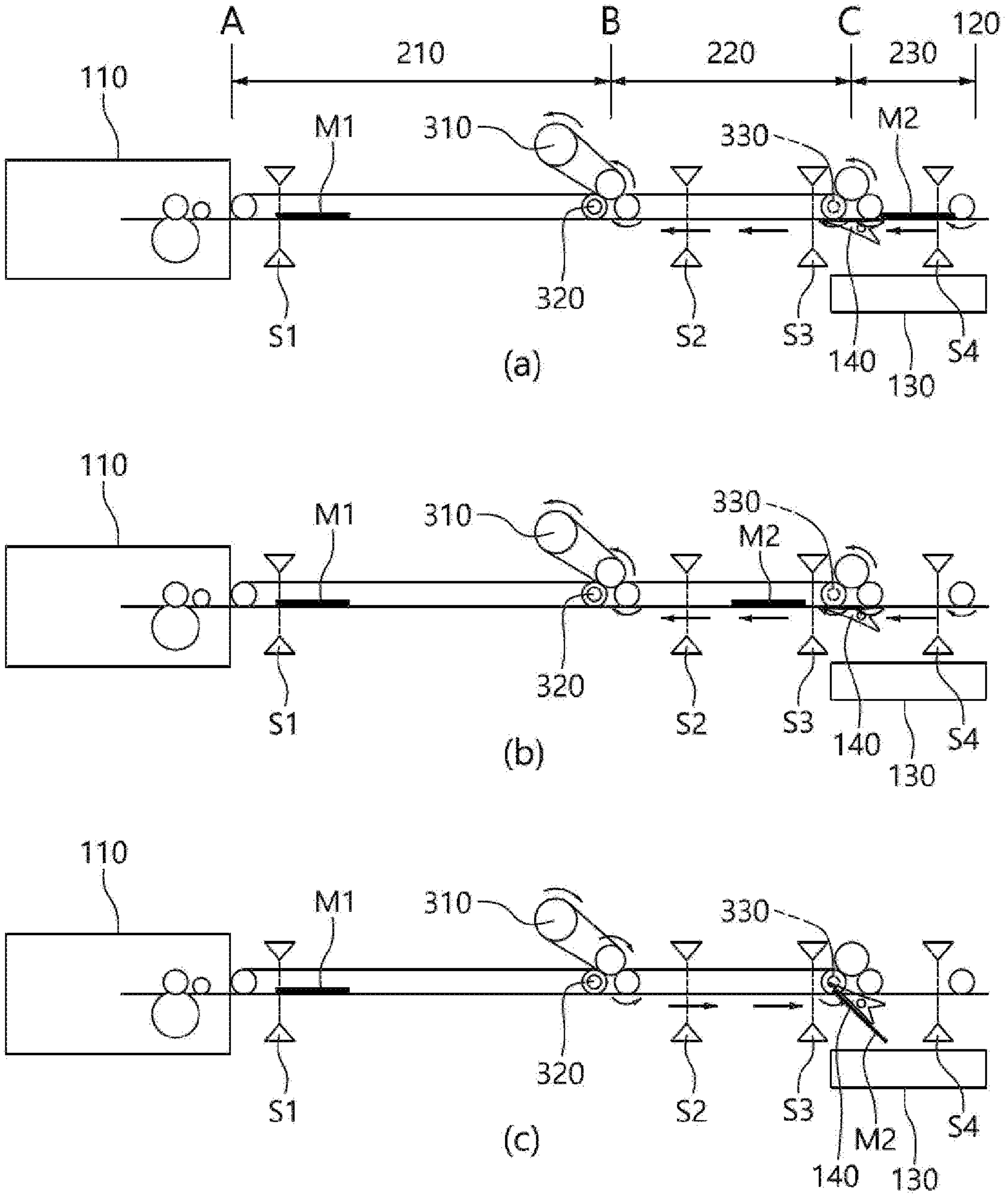
FIG. 6 is a set of diagrams showing an operation of retrieving bills remaining on a third conveyance part when bills remain on the first conveyance part in the CDU according to the present invention.

Referring to FIG. 6, in the case of retrieving bills remaining on the third conveyance part 230, the controller 400 performs control so that the gate 140 enters the closed position, the motor 310 is driven in the reverse direction, and the clutch 330 enters the on state. Then, the bills remaining on the third conveyance part 230 are conveyed back to the second conveyance part 220 (see FIG. 6A).

After that, when the sensor S3 for a recovery operation detects that the bills are conveyed to the second conveyance part 220 (see FIG. 6B), the controller 400 performs control so that the gate 140 is put in the open position, the motor 310 is driven in the forward direction, and the clutch 330 enters the off state. Then, the second conveyance part 220 is driven in the forward direction, and the bills are conveyed from the second conveyance part 220 to the retrieval part 130 and retrieved (see FIG. 6C).

Here, in the case of retrieving bills M2 remaining on the third conveyance part 230, bills M1 may remain on the first conveyance part 210. Even in this case, when the motor 310 is driven in the reverse direction, the first conveyance part 210 is stopped by the one-way bearing 320, and the bills M1 remaining on the first conveyance part 210 may remain stationary without being conveyed back toward the storage 110. Accordingly, it is possible to prevent a bill jam which may be caused when the bills M1 remaining on the first conveyance part 210 are conveyed back toward the storage 110.

Figure 7:
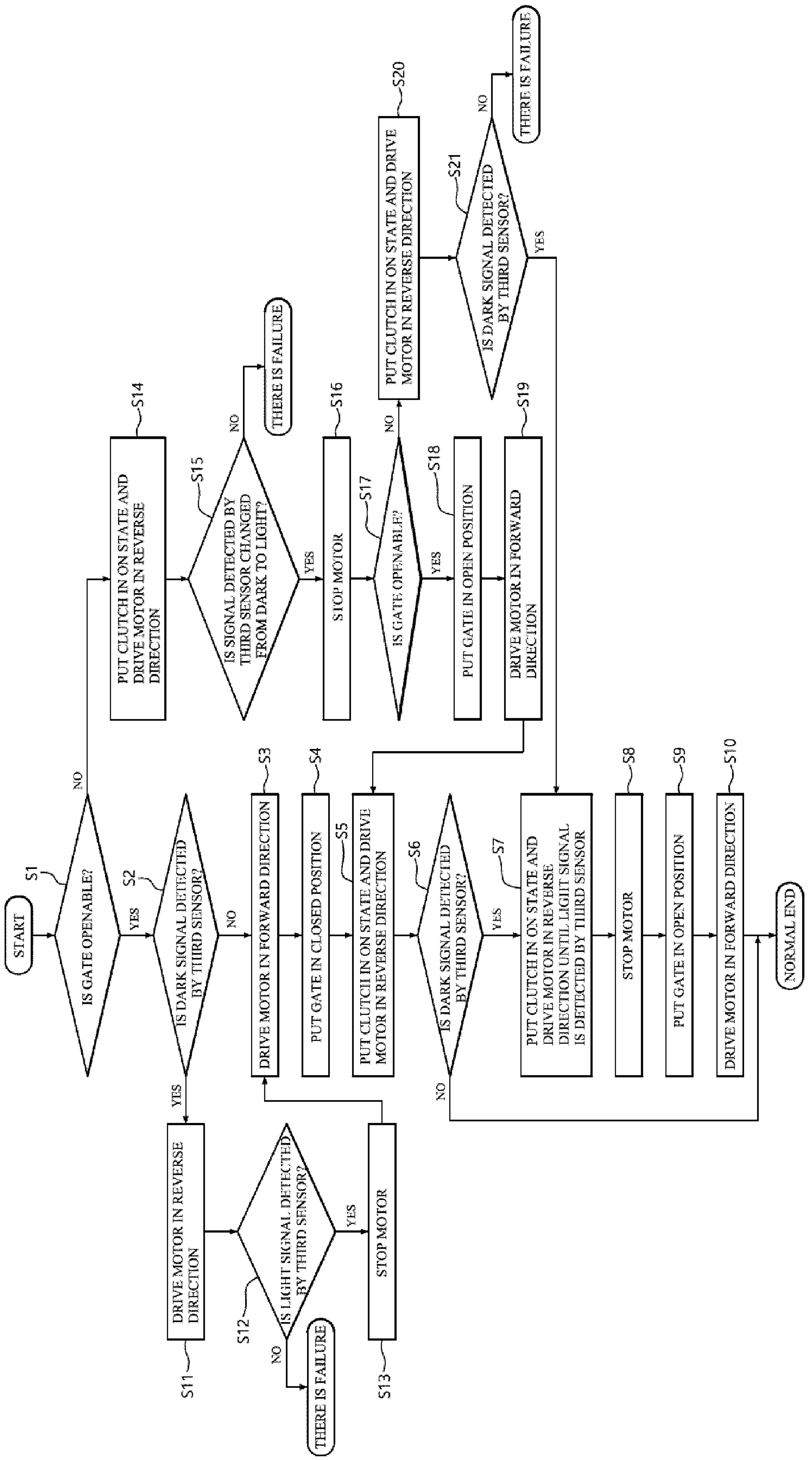
FIG. 7 is a flowchart illustrating an automatic recovery method of the CDU according to the present invention.

An automatic recovery method of the CDU 1 configured as described above according to the present invention will be described in further detail below by stages with reference to FIG. 7.

According to the automatic recovery method of CDU 1 of the present invention, in the case of automatic recovery of the CDU 1, bills remaining on the first conveyance part 210 and the second conveyance part 220 are first retrieved by the retrieval part 130, and then bills remaining on the third conveyance part 230 are retrieved by the retrieval part 130.

First, it is determined whether the gate 140 is in an openable state (S1). In this operation, the gate 140 is rotated in both directions to be in the open position and the closed position, and whether the gate 140 is in an openable state is determined on the basis of whether the gate sensor S5 detects the gate 140 in the open position and the closed position normally.

When the gate 140 is in an openable state, it is determined whether there is a remaining bill on the basis of a signal detected by the sensor for a recovery operation (third sensor) S3 (S2).

When no bills are detected by the sensor S3 for a recovery operation, the motor 310 is driven in the forward direction which is a bill withdrawal direction with the gate 140 in the open position so that bills remaining on the first conveyance part 210 and the second conveyance part 220 are retrieved by the retrieval part 130 (S3).

When retrieval of the bills remaining on the first conveyance part 210 and the second conveyance part 220 is completed, the gate 140 is switched to the closed position (S4).

Subsequently, as an operation for retrieving bills which may remain on the third conveyance part 230, the clutch 330 enters the on state, and the motor 310 is driven in the reverse direction (S5).

In this case, the second conveyance part 220 and the third conveyance part 230 are driven in the reverse direction, and the sensor S3 for a recovery operation detects whether bills pass (S6).

When the sensor S3 for a recovery operation detects no passing bills, there are no bills remaining on the third conveyance part 230. Accordingly, it is determined that there are no more bills to be retrieved, and the bill retrieval operation is finished.

When bills are detected by the sensor S3 for a recovery operation, the motor 310 is driven in the reverse direction with the clutch 330 in the on state until it is found that a signal detected by the sensor S3 for a recovery operation is changed from dark into light (S7).

When the signal detected by the sensor S3 for a recovery operation is changed from dark into light, the bills pass through the sensor S3 for a recovery operation and are placed on the second conveyance part 220, and the motor 310 is stopped (S8).

Subsequently, the gate 140 is put in the open position (S9). After that, the clutch 330 is put in the off state, and the motor 310 is driven in the forward direction to drive only the second conveyance part 220 in the forward direction and retrieve the bills to the retrieval part 130 (S10).

Meanwhile, in operation S2, when bills are detected by the sensor S3 for a recovery operation with the gate 140 in the openable state, it may be determined that the bills are placed at the sensor S3 for a recovery operation. In this case, the motor 310 is driven in the reverse direction (S11).

Subsequently, it is determined whether the bills are passed through the sensor S3 for a recovery operation due to the reverse driving of the motor 310 (S12).

In operation S12, when the sensor S3 for a recovery operation detects no bills passing therethrough, it is determined that there is a failure because the bills are not moving in the reverse direction and have jammed up.

In operation S12, when the sensor S3 for a recovery operation detects the bills passing therethrough, the motor 310 is stopped (S13), and the process returns to operation S3 so that an operation of retrieving bills which may remain on the third conveyance part 230 is performed.

Meanwhile, in operation S1, when the gate 140 is not in an openable state, it may be determined that the gate 140 is not rotating normally because there is a bill on the gate 140. In this case, the clutch 330 is put in the on state, and the motor 310 is driven in the reverse direction (S14).

Then, the sensor S3 for a recovery operation detects whether the bill passes therethrough (S15).

In operation S15, when a signal detected by the sensor S3 for a recovery operation is not changed from dark to light, there is a jam because the bill is stalled without moving in the reverse direction. Accordingly, it is determined that a failure has occurred.

In operation S15, when the signal detected by the sensor S3 for a recovery operation is changed from dark to light, the motor 310 is stopped (S16).

Then, it is determined again whether the gate 140 is in an openable state (S17). This operation is for the purpose of determining whether the bills remaining on the third conveyance part 230 are conveyed in the reverse direction by the third conveyance part 230 driven in the reverse direction and placed on the gate 140.

In operation S17, when the gate 140 is in an openable state, the gate 140 is put in the open position (S18), the motor 310 is driven in the forward direction (S19), and the process returns to operation S5 so that an operation of retrieving bills which may remain on the third conveyance part 230 is performed.

In operation S17, when the gate 140 is not in an openable state, the clutch 330 is put in the on state again, and the motor 310 is driven in the reverse direction (S20). Then, the sensor S3 for recovery detects whether the bills pass therethrough due to the reverse driving of the motor 310 (S21).

In operation S21, when the sensor S3 for a recovery operation detects the bills passing therethrough, the process returns to operation S7 so that an operation of retrieving the bills is performed.

In operation S21, when the sensor S3 for a recovery operation detects no bills passing therethrough, it is determined that there is a failure.

With a CDU according to the present invention, it is possible to simplify a bill conveyance structure by driving a plurality of separated conveyance parts using one motor.

Also, a first conveyance path and a second conveyance path are connected by a one-way bearing, and power transmission to the second conveyance path and a third conveyance path is controlled by a clutch. Accordingly, bills which remain on a conveyance path when a CDU recovers from a power failure or is initialized can be smoothly retrieved without causing a jam so that the CDU can recover to a normal operation state.

With an automatic recovery method of a CDU according to the present invention, it is possible to stably retrieve bills remaining on a conveyance part without causing a jam using three conveyance parts when the CDU recovers from a power failure or is initialized so that the CDU can recover to a normal operation state.

As described above, the present invention is not limited to the exemplary embodiments described above. The present invention can be implemented in modified forms that are self-evident to those skilled in the technical field to which the present invention pertains, without departing from the technical scope of the present invention defined in the claims, and the modified implementations fall within the scope of the present invention.

What is claimed is:

1. A cash dispenser unit (CDU) comprising:

a storage configured to store bills;

a withdrawal part configured to externally discharge bills withdrawn from the storage;

a retrieval part configured to retrieve bills remaining on a bill conveyance path between the storage and the withdrawal part;

a conveyance part configured to provide the bill conveyance path between the storage and the retrieval part and the bill conveyance path between the storage and the withdrawal part and including a first conveyance part connecting an outlet of the storage and a conveyance path connector, a second conveyance part connecting the conveyance path connector and an entry of the retrieval part, and a third conveyance part connecting the entry of the retrieval part and the withdrawal part, wherein the first conveyance part, the second conveyance part, and the third conveyance part are driven by one motor;

a gate provided at the entry of the retrieval part and configured to switch a travel direction of bills passing through the conveyance path toward the retrieval part; and a controller configured to control an operation of withdrawing or retrieving the bills and restore the CDU to a normal operation state in a case of initialization or recovery from a power failure by retrieving bills remaining on the bill conveyance path of the conveyance part to the retrieval part.

2. The CDU of claim 1, wherein the first conveyance part includes a one-way bearing that is driven only in a forward direction corresponding to a bill withdrawal direction by receiving driving power of the motor and cuts off transmission of the driving power of the motor in a reverse direction of the forward direction, and the second conveyance part is driven in the forward direction or the reverse direction by receiving the driving power of the motor, the CDU further comprising a clutch configured to control transmission of the driving power of the motor transmitted by the second conveyance part to the third conveyance part.

3. The CDU of claim 2, wherein, when the motor is driven in the forward direction, the first conveyance part and the second conveyance part are driven together in the forward direction, when the motor is driven in the reverse direction, the first conveyance part is stopped, and the second conveyance part is driven in the reverse direction, when the clutch enters an on state, the third conveyance part is driven in conjunction with the second conveyance part, and when the clutch enters an off state, the third conveyance part is stopped, and the second conveyance part is driven according to a driving direction of the motor.

4. The CDU of claim 3, wherein a plurality of sensors are provided on the bill conveyance path to detect whether bills pass through the plurality of sensors, the gate is rotatable in both directions between an open position in which the travel direction of the bills passing through the bill conveyance path is set toward the retrieval part, and a closed position in which the bills pass along the bill conveyance path between the second conveyance part and the third conveyance part, and the gate includes a gate sensor configured to detect whether the gate is in the open position or the closed position.

5. The CDU of claim 4, wherein, when the plurality of sensors detect that a bill remains on the bill conveyance path of at least one of the first conveyance part and the second conveyance part, the controller retrieves the bill remaining on the bill conveyance path to the retrieval part by performing control so that the gate enters the open position, the motor is driven in the forward direction, and the clutch enters the off state.

6. The CDU of claim 4, wherein, when the gate sensor does not detect the open position or the closed position, the controller determines that the gate is in an unopenable state, drives the motor in the reverse direction and puts the clutch in the on state so that the second conveyance part and the third conveyance part are driven in the reverse direction and the bill remaining on the bill conveyance path is conveyed to the second conveyance part, and when a sensor for a recovery operation provided apart from the entry of the retrieval part on the second conveyance part detects that the bill is conveyed back to the second conveyance part, drives the second conveyance part in the forward direction by putting the gate in the open position, driving the motor in the forward direction, and putting the clutch in the off state so that the bill is conveyed from the second conveyance part to the retrieval part and retrieved.

7. The CDU of claim 4, wherein, in a case of retrieving a bill remaining on the third conveyance part, the controller drives the second conveyance part and the third conveyance part in the reverse direction by putting the gate in the closed position, driving the motor in the reverse direction, and putting the clutch in the on state so that the bill remaining on the third conveyance part is conveyed back to the second conveyance part, and when a sensor for a recovery operation provided apart from the entry of the retrieval part on the second conveyance part detects that the bill is conveyed back to the second conveyance part, drives the second conveyance part in the forward direction by putting the gate in the open position, driving the motor in the forward direction, and putting the clutch in the off state so that the bill is conveyed from the second conveyance part to the retrieval part and retrieved.

8. The CDU of claim 7, wherein, in the case of retrieving the bill remaining on the third conveyance part, even when a bill remains on the first conveyance part and the motor is driven in the reverse direction, the first conveyance part is stopped by the one-way bearing so that the bill remaining on the first conveyance part remains stationary without being conveyed back toward the storage.

9. An automatic recovery method of a cash dispenser unit (CDU), which includes a storage for storing bills, a withdrawal part for externally discharging bills withdrawn from the storage, a retrieval part for retrieving bills remaining on a bill conveyance path between the storage and the withdrawal part, a conveyance part for providing the bill conveyance path between the storage and the retrieval part and between the storage and the withdrawal part, and a gate provided at an entry of the retrieval part to switch a travel direction of bills passing through the bill conveyance path toward the retrieval part, for retrieving a bill remaining on the bill conveyance path in the CDU to the retrieval part, wherein the conveyance part includes a first conveyance part connecting an outlet of the storage and a conveyance path connector, a second conveyance part connecting the conveyance path connector and an entry of the retrieval part, and a third conveyance part connecting the entry of the retrieval part and the withdrawal part, the automatic recovery method comprising retrieving bills remaining on the first conveyance part and the second conveyance part to the retrieval part and then retrieving bills remaining on the third conveyance part to the retrieval part.

10. The automatic recovery method of claim 9, wherein the gate is rotatable in both directions between an open position in which the travel direction of the bills passing through the bill conveyance path is set toward the retrieval part, and a closed position in which the bills are passed along the bill conveyance path between the second conveyance part and the third conveyance part, and the conveyance part is driven by one motor and includes a clutch configured to control transmission of driving power of the motor transmitted by the second conveyance part to the third conveyance part, the automatic recovery method further comprising:

determining whether the gate is in an openable state;

when the gate is in the openable state, determining whether there is a remaining bill on the basis of a signal detected by a sensor for a recovery operation provided apart from the entry of the retrieval part on the second conveyance part;

when no bill is detected by the sensor for a recovery operation, driving the motor in a forward direction corresponding to a bill withdrawal direction with the gate in the open position to retrieve bills remaining on the first conveyance part and the second conveyance part to the retrieval part;

putting the gate in the closed position, putting the clutch in an on state, and driving the motor in a reverse direction; and when the sensor for a recovery operation detects bills which are conveyed back from the third conveyance part passing therethrough, putting the gate in the open position and driving the motoring in the forward direction to retrieve the bills to the retrieval part.

11. The automatic recovery method of claim 10, further comprising:

when the sensor for a recovery operation detects a bill with the gate in the openable state, driving the motor in the reverse direction; and when the sensor for a recovery operation detects the bill passing therethrough due to reverse driving of the motor, stopping the motor and then driving the motor in the forward direction to retrieve the bill to the retrieval part.

12. The automatic recovery method of claim 11, wherein, when the sensor for a recovery operation detects no bill passing therethrough after the driving of the motor in the reverse direction, it is determined that there is a failure.

13. The automatic recovery method of claim 10, further comprising:

when the gate is in an unopenable state, putting the clutch in the on state and driving the motor in the reverse direction;

when the sensor for a recovery operation detects a bill passing therethrough due to reverse driving of the motor, stopping the motor;

determining again whether the gate is in the openable state; and when the gate is in the openable state, putting the gate in the open position and driving the motor in the forward direction to retrieve the bill to the retrieval part.

14. The automatic recovery method of claim 13, wherein, when the sensor for a recovery operation detects no bill passing therethrough after the driving of the motor in the reverse direction, it is determined that there is a failure.

15. The automatic recovery method of claim 13, further comprising:

when it is determined that the gate is not in the openable state in the determining again of whether the gate is in the openable state, putting the clutch in the on state and driving the motor in the reverse direction; and when the sensor for a recovery operation detects a bill passing therethrough due to reverse driving of the motor, stopping the motor and driving the motor in the forward direction to retrieve the bill to the retrieval part.

16. The automatic recovery method of claim 15, wherein, when the sensor for a recovery operation detects no bill passing therethrough, it is determined that there is a failure.

* * * * *